United States Patent

Führer et al.

[11] Patent Number: 5,871,415
[45] Date of Patent: Feb. 16, 1999

[54] HELICALLY CUT PLANETARY GEAR

[75] Inventors: Gerhard Führer; Kurt Osterloff, both of Friedrichshafen, Germany

[73] Assignee: ZF Friedrichshafen AG, Friedrichshafen, Germany

[21] Appl. No.: 817,225

[22] PCT Filed: Nov. 2, 1996

[86] PCT No.: PCT/EP95/04282

§ 371 Date: Apr. 11, 1997

§ 102(e) Date: Apr. 11, 1997

[87] PCT Pub. No.: WO96/15393

PCT Pub. Date: May 23, 1996

[30] Foreign Application Priority Data

Nov. 9, 1994 [DE] Germany .......................... 44 39 976.6

[51] Int. Cl.⁶ .................................................. F16H 57/02
[52] U.S. Cl. ........................................... 475/346; 475/331
[58] Field of Search .................................... 475/331, 344, 475/346

[56] References Cited

U.S. PATENT DOCUMENTS

| Re. 33,428 | 11/1990 | Larsson | 475/346 X |
| 4,756,212 | 7/1988 | Fuehrer | 475/331 X |
| 4,901,602 | 2/1990 | Matoba | 475/331 |
| 4,998,909 | 3/1991 | Fuehrer | 475/348 X |
| 5,370,590 | 12/1994 | Premiski et al. | 475/346 |
| 5,385,514 | 1/1995 | Dawe | 475/346 X |
| 5,649,879 | 7/1997 | Kusumoto et al. | 475/346 X |

FOREIGN PATENT DOCUMENTS

| 2 588 344 | 4/1987 | France . |
| 401652 | 9/1924 | Germany . |
| 28 15 847 | 11/1979 | Germany . |
| 42 16 397 A1 | 11/1993 | Germany . |

Primary Examiner—Khoi Q. Ta
Attorney, Agent, or Firm—Davis and Bujold

[57] ABSTRACT

A planetary gear designed with helically cut teeth, in particular for motor vehicles, is provided with a sun wheel (1), which is non-rotatably connected with the drive shaft (2), a plurality of planet gears (4) mounted in a planet carrier (6) and a ring gear (7) which surrounds the planet gears (4) and is connected with a ring-gear carrier (8). In order to absorb axial forces, pairs of pressure surfaces (19, 20, 24) are provided on thrust rings (17, 18, 22) and the planet gears (4). Preferably, one pair of pressure surfaces (19) is provided between the sun wheel (1) or drive shaft (2), on the one hand, and the planet gears (4), on the other, and one pair of pressure surfaces (24) is provided between the planet gears (4) and the ring gear (7).

20 Claims, 4 Drawing Sheets

HELICALLY CUT PLANETARY GEAR

The invention concerns a helically cut planetary gear in particular for motor vehicles having a sun wheel non-rotatably connectable with a drive shaft, a plurality of planet gears mounted in a planet-gear carrier and, surrounding the planet gears, a ring gear connected with a ring-gear carrier.

BACKGROUND OF THE INVENTION

The use of planetary gears in the construction of motor vehicles is generally already known. Helically cut planetary gears clearly have a lower noise level compared to planetary gears with straight cut teeth, and this becomes more and more important in view of the increasingly stricter regulations for noise protection.

It is also an advantage of the simply helically cut design that external axial forces are not transmitted to the gearing as a result of heat expansion or clutch thrust. Therein resulting in a smaller total gear width and thus less expensive forging blanks.

The expensive production and assembly of helically cut planetary gears, as well as the prevalence of strong axial forces resulting from the helically cut teeth are problematic. Said axial forces severely strain adjacent parts such as the drive shaft and the output shaft. At the same time high tipping torques also act on the planetary gears considerably straining the radial bearings. Due to the free axial forces from the teeth it is not possible to vary the helical angles, since the forces upon the axial thrust bearings otherwise become too strong. In simple helically cut teeth, the helix angles usually fluctuate between from ten to fifteen degrees. No great overlap ratio takes place due to the small helix angles. Additionally, the required axial thrust bearings cause elevated storage losses and poorer efficiency.

German Patent 401,652 has disclosed a spur-gear drive having a simple helical cut in which a thrust ring which rotates at the same time is provided for absorbing the axial thrusts. Different arrangements of the thrust ring are provided. One of which is designed so as to absorb axial thrusts not only in one direction, but also able to absorb axial thrusts in both directions by situating on one ring pressure surfaces opposite to each other. Occurring impacts can be absorbed by elastic elements between thrust ring and gear, for example, by resilient design of the thrust rings or by elastic intermediate elements.

German Patent 28 15 847, for example, has disclosed the following as methods for mounting the thrust rings:
1. The thrust ring is screwed on the face end. This type of mounting is possible only in gears having relatively large pinions (small reduction ratio), since the inwardly reaching flange of the thrust ring requires additional space.
2. The thrust ring is shrunk fit without additional security against displacement. For sufficient security against slippage, this type of mounting requires, together with strong shrinking compression, large widths of the shrinking ring. This is necessary in the case of high speeds due to the reductions of compression appearing here as consequence of the expansion of the ring. But large thrust ring widths produce disadvantageous enlargements of the widths of the wheel set and gear.
3. The thrust ring is shrunk fit upon the shaft. But is additionally secured by a divided ring and guard ring. Said additional security act, against the insecurity of the slip joint and against unfavorable stress of the thrust ring caused in spur-gear transmissions by the eccentric application of force of the axial thrust. Security elements are usually nuts, guard rings, two-part spacers with added guard ring and radial pins, the same as screws. Experiences with screwed-on thrust rings have shown, together with the disadvantage of a constructionally expensive design, that it is necessary to carry out the fine processing (grinding) of the thrust faces of the thrust ring only after the shrink fitting operation, as otherwise an impact-free motion of the pressure faces is not ensured due to the misalignment of the thrust ring produced during the shrinking operation. This requirement is detrimental to production from industrial and economic points of view.
4. The thrust ring rests upon the shaft with a transitional or light press fit and is joined to the shaft by electron-beam welding to form a one-piece homogeneous unit.

DE-OS 42 16 397 describes a planetary gear with helical cut design, particularly for motor vehicles, which is provided with a sun wheel non-rotatably connectable with a drive shaft, a plurality of planet gears mounted on a planet carrier and surrounding the planet gears a ring gear which is connected with a ring-gear carrier. For absorbing axial forces there are provided between the sun wheel and the planet gears and between the planet gears and the ring gear thrust rings which are placed on the face ends of the respective gears. The thrust rings are situated on both sides of the planet gears in order to absorb the axial forces both in push and pull directions. This means an expensive assembly due to the arrangement of four pairs of pressure surfaces and at the same time elevated cost, since the pressure surfaces must be carefully and expensively manufactured to obtain a secured lubricant wedge therebetween. The thrust rings are here welded on both sides on the sun wheel.

SUMMARY OF THE INVENTION

Therefore, this invention is based on the problem of overcoming the above described problems existing in a helically cut planetary gear, especially of providing a planetary gear that can be produced at low cost and is easily assembled in which the axial forces that occur can be better coped with.

According to the invention this problem is solved by providing a pair of pressure surfaces between the sun wheel and the planetary gears and a pair of pressure surfaces between the planetary gears and the ring-gear carrier for absorbing the axial forces in the traction operation. There is no axial support in the coasting operation. It is possible here to situate on the sun wheel a thrust ring which by its pressure surface is in contact with a pressure surface of the planet gears on the side remote from the ring-gear carrier, while the planet gears are in contact by their pressure surfaces facing the ring-gear carrier with a pressure surface of a thrust ring on the ring-gear carrier. It is also possible to design the sun wheel being directly formed by teeth on the drive shaft of the planetary gear, for example, on the main shaft of a front-mounted multi-step main gear, the thrust ring be non-rotatably slipped by its inner teeth upon said sun wheel so designed, its pressure surface in contact with the pressure surface of the planet gears remote from the ring-gear carrier for absorbing axial forces. Such a thrust ring can then be supported, for example, on a taper roller bearing on the transmission housing. The helix direction of sun-wheel teeth thus designed is oriented in a manner such that the axial forces occurring in the traction operation can be absorbed by the pairs of pressure surfaces. The planet gears are here designed with pressure surfaces on both sides.

By virtue of the pairs of pressure surfaces according to the invention it is possible to eliminate directly at the place of origin the axial forces appearing in the traction operation which is the most frequently occurring operating condition. In this manner the axial forces act neither upon the sun wheel nor upon the planet gears, since the axial force is absorbed by the pairs of pressure surfaces. Thus the axial forces constitute inner forces which do not act upon the structural part and thus could not axially stress it.

In a planetary gear acting as group transmission, the ring-gear carrier, with the aid of a switching device such as a synchronizing device, can be connected either in a first switching position with the transmission housing or in a second switching position with the planet carrier via a clutch body. In this invention, it is proposed for the ring-gear carrier support to absorb the axial forces of the ring gear in coasting operation, to provide an axial bearing between ring-gear carrier and the clutch body non-rotatably connected with the planet carrier. Said bearing must have more axial play than the axial play of the support of the planet carrier within the transmission housing.

The ends of the planet gear teeth and of the ring-gear teeth are axially freely movable in the area of the ring-gear teeth at the end of the ring-gear teeth opposite the ring-gear carrier while the ends of the sun wheel teeth and of the planet-gear teeth are axially freely movable in the area of the sun-wheel teeth at the end of the sun wheel teeth opposite the pair of pressure surfaces between planet gear and sun wheel.

In a development according to the invention, it can be provided at the same time that the pressure surfaces be arranged so as to project up into the gear body of the planet gears. In this manner, the pressure surfaces lie radially inward in relation to the pitch circle of the planet gears. But the speed difference that occurs is here relatively small, especially as the pressure surface is nearer the pitch circle.

It is also possible to situate pressure rings on the planet gears, the pressure surfaces being in this case radially outside the pitch circle of the sun wheel, but a greater expense and effort would be required for this, since according to the number of existing planet gears, corresponding pressure rings would be needed for each planet gear.

In the development described above, there is only one thrust ring necessary, which forms one pair of pressure surfaces. The other pressure surfaces are advantageously formed by the two sides of the planet gears and by one pressure surface integrated in the ring-gear carrier.

In an advantageous embodiment, it can be provided that the pressure surfaces be crowned or conical, making possible the cone angle between five angular minutes and six degrees.

By said embodiment an oil film or oil wedge can form between the pressure surfaces whereby only very small frictional forces appear.

In a helically cut planetary gear, there necessarily appear corresponding axial forces depending on the helical direction of the teeth. The ring gear is generally slipped via clutch teeth upon a ring-gear carrier, one guard ring on one side taking care of an axial fastening. The guard ring here is generally on the side of the ring-gear carrier.

When the planetary gear is installed in a motor vehicle, the helical cut is selected so that in case of traction load the axial forces be directed in direction to the pressure surfaces. In the usual clockwise rotating motors this means a helical direction with clockwise teeth for the sun wheel.

BRIEF DESCRIPTION OF THE DRAWINGS

Below are embodiments of the invention shown in principle with reference to drawings in which.

DESCRIPTION OF THE PREFERRED EMBODIMENT(S)

Since the planetary gear described below is of known construction, it will be briefly described with details provided only for parts according to the invention.

Figure 1:
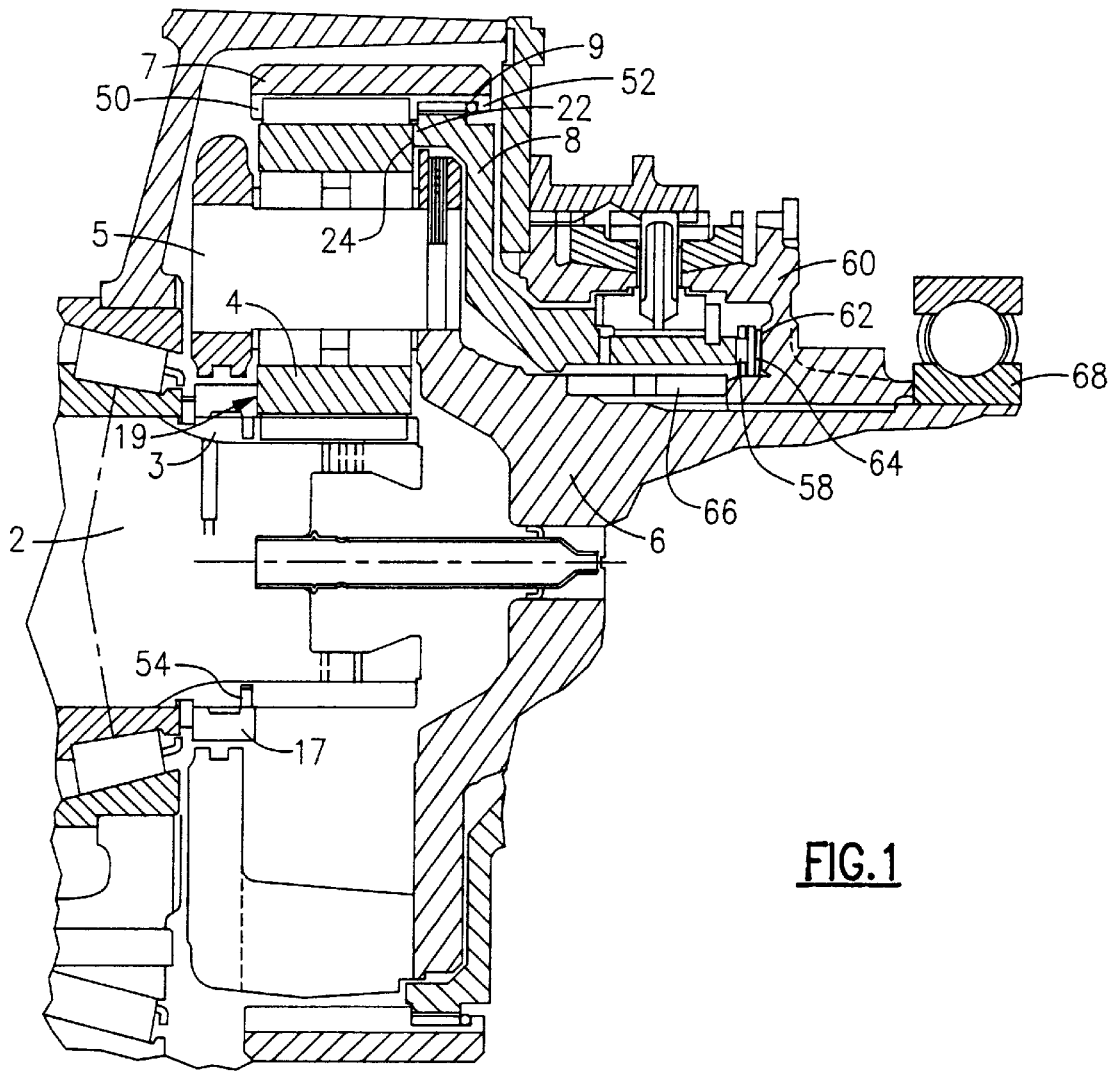
FIG. 1 is a section through the planetary gear according to the invention.

In FIG. 1 is designed the end of a drive shaft 2 which is, in general, the main shaft of a gear with sun-wheel teeth 3. Around the sun-wheel teeth 3 are arranged several planet gears 4 which are supported on respective bolts 5 which, in turn, are fastened to a planet carrier 6 if not integral with the planet carrier 6.

The planet gears 4 are surrounded by a ring gear 7 with inner teeth 50. The sun-wheel teeth 3 and the planet gears 4, the same as the inner teeth 50 of the ring gear 7, are each alternatively helically cut.

The ring gear 7 is connected with a ring-gear carrier 8 via clutch teeth 52 which, in general, are part of an extension of the inner teeth 50 of the ring gear 7. On the right side of the drawing, a guard ring 9, which is in a peripheral groove in the inner peripheral wall of the ring gear 7, constitutes an axial fastening.

The ring-gear carrier 8 is supported in an axial direction relative to the planet carrier 6. This is preferably obtained by a roller bearing 58 between the ring-gear carrier 8 and the clutch body 60 of the synchronization device of the group transmission, it being possible to place a disc 62 and a plate spring 64, between the roller bearing 48 and the clutch body 60, in order to enable the roller bearing 58 to have an axial play. The clutch body 60 is axially fixed upon the planet carrier 6, for example, by one ring 66, on one hand, and on the other by the support 68 of the planet carrier 6 in the transmission housing.

Figure 3:
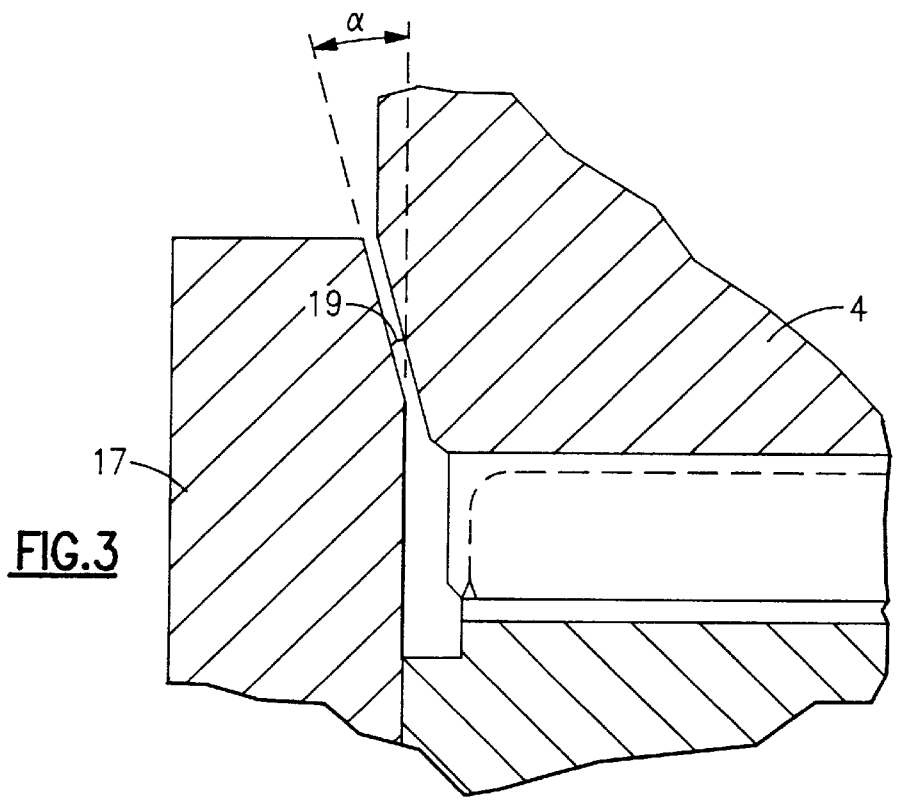
FIG. 3 is a cutout enlargement of a thrust ring between a sun wheel and a planet gear.

Between the planet gears 4 and the drive shaft 2 is situated a thrust ring 17 which meshes, by inner teeth 54, with the sun-wheel teeth 3 and is thus non-rotatably connected with the drive shaft 2. The thrust ring 17, has here a height and a radius such as to project to an area which forms one pressure surface up into the body of the planet gears 4, that is, up into the area of the uncut parts of the planet gears 4. The design is more clearly seen in FIG. 3. In this manner, the thrust ring 17 constitutes a lateral guide through the pair of pressure surfaces 19. As it can further be seen from FIG. 3, the pair of pressure surfaces 19, between the thrust ring 17 and the planet gears 4, are designed helically or slightly conically, with a cone angle α of between five angular minutes and six degrees, expanding outwardly starting from the cut part, it being also optionally possible to provide a crown.

Figure 4:
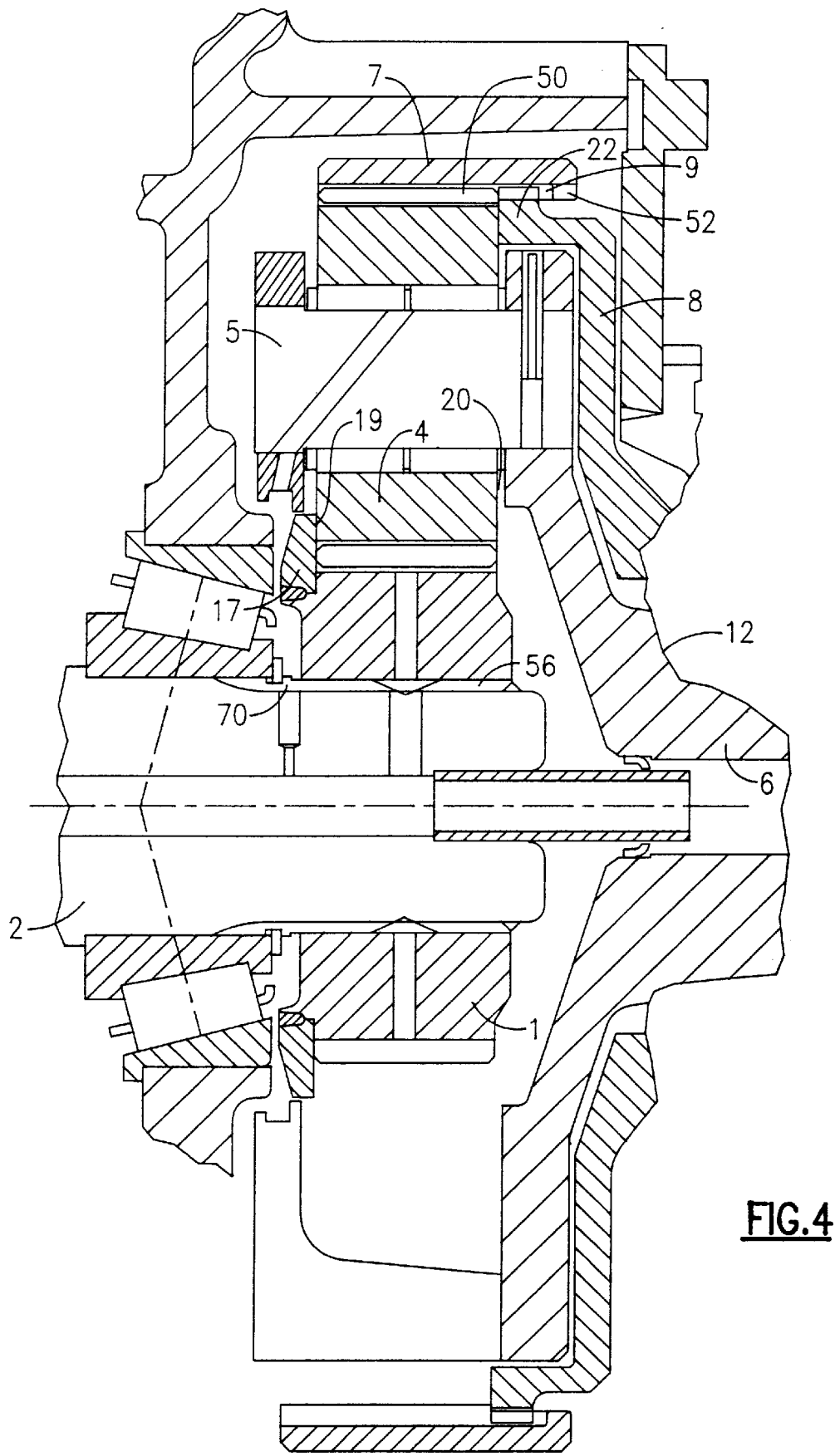
FIG. 4 is another embodiment according to FIG. 1.

In FIG. 4, the arrangement of FIG. 1 has been altered in the sense that a separate sun wheel 1 is provided. Said sun wheel 1 meshes, via clutch teeth 56, with the teeth 70 of the drive shaft 2 and is thus non-rotatably connected with the drive shaft 2. On the side of the sun wheel 1 facing the drive shaft 2, a thrust ring 17 is situated, for example, by welding. The thrust ring 17 has here a height and radius such as to project to an area which forms a pressure surface up into the gear bodies of the planet gears 4, that is, up into the area of the uncut parts of the planet gears 4. This design is clearly shown, see FIG. 3. In this manner, the thrust ring 17 constitutes a lateral guide through the pair of pressure surfaces 19. As it can further be seen from FIG. 3, the pair of pressure surfaces 19, between the thrust ring 17 and the planet gears 4, are designed helically or slightly conically, with a cone angle α of between five angular minutes and six degrees, expanding outwardly starting from the cut part, it being optionally possible to provide a crown.

Figure 5:
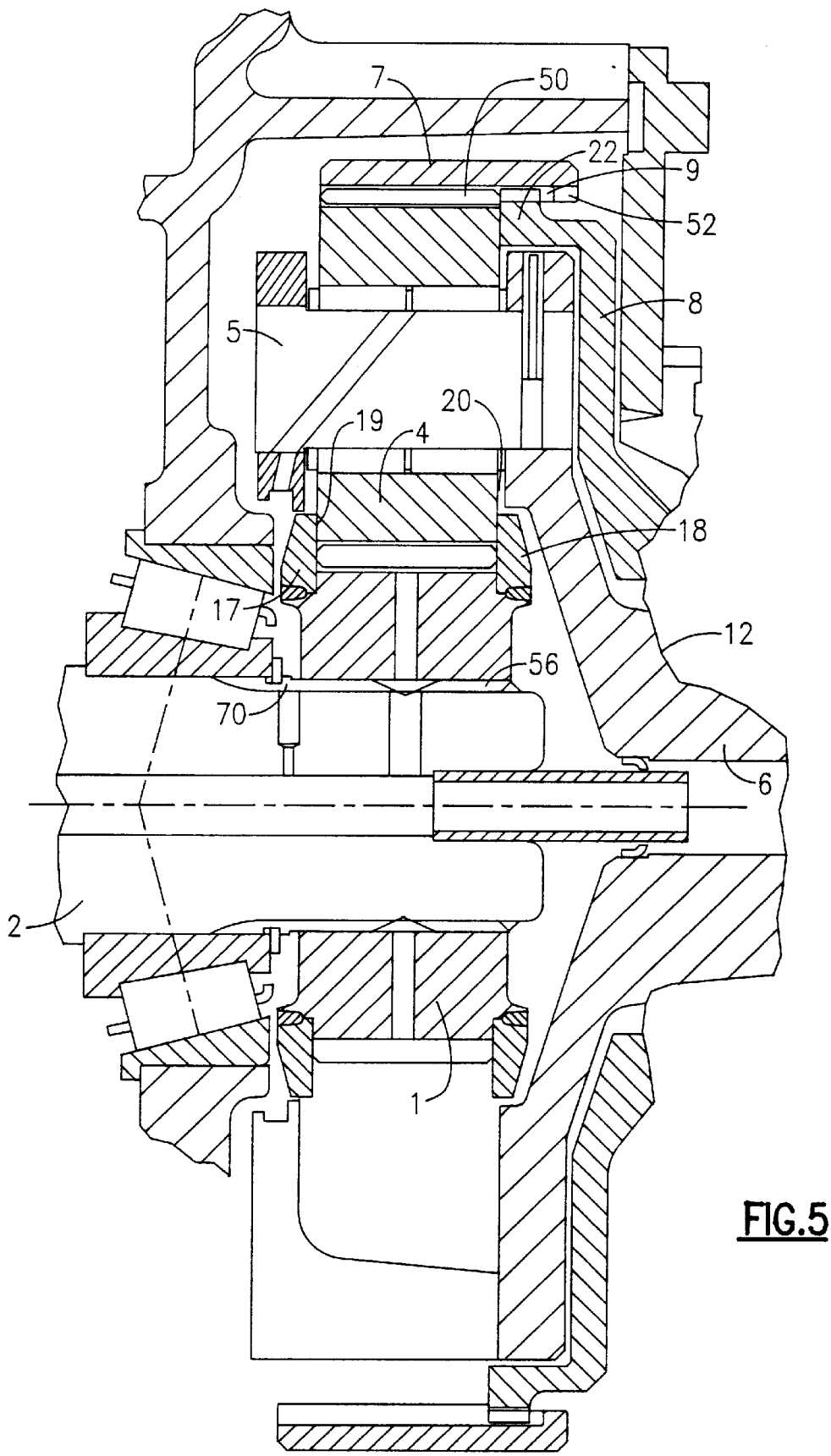
FIG. 5 is another embodiment according to FIG. 4.

In FIG. 5, the arrangement of FIG. 4 has been altered in the sense that thrust rings 17 and 18 have been situated, for example, by welding, on both sides of the sun wheel 1.

Both thrust rings 17 and 18 have here a height and radius such as to project to an area which forms pressure surfaces up into the gear bodies of the planet gears 4, that is, up into the areas of the uncut parts of the planet gears. This design can be more clearly seen in FIG. 3. In this manner, both thrust rings 17 and 18 constitute lateral guides through the corresponding pair of pressure surfaces 19 and 20. As can further be seen from FIG. 3, the pairs of pressure surfaces 19 and 20 are designed helically or slightly conically, with a cone angle α of between five angular minutes and six degrees, expanding outwardly starting from the cut part, it being also optionally possible to provide a crown.

Figure 2:
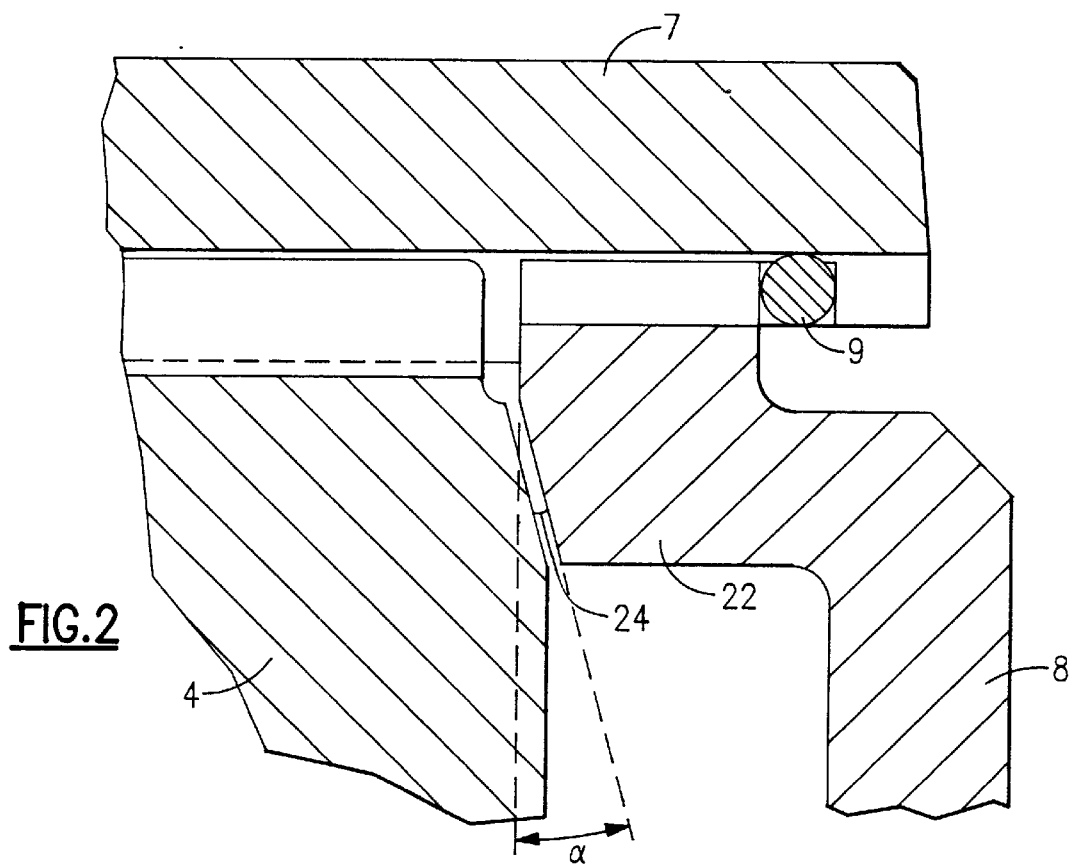
FIG. 2 is a cutout enlargement of a portion of the ring gear with a thrust ring.

FIG. 2 shows, for all designs, that the axial forces are absorbed in the same manner between the ring-gear carrier 8 and the planet gears 4 by a thrust ring 22. The thrust ring 22 is integrated into or upon the ring-gear carrier 8. For this purpose, it is adequately designed on its outer peripheral area, on the side oriented toward the planet gears 4, so as to form together with the corresponding opposite area of the sidewalls of the planet gears 4 a pair of pressure surfaces 24.

The planetary gear assembled in the following different designs:

The simplest assembly is possible in the design according to FIG. 1.

The thrust ring 17 is first slipped on the sun-wheel teeth 3. The planet gears 4 are then inserted in the thrust ring 17. The bolts 5 are then passed through the bores of the planet gears 4 and firmly connected with the previously positioned planet carrier 6.

Thereafter the ring gear 7 is pushed over the planet gears 4 and the ring-gear carrier 8 is inserted in the clutch teeth 52 of the ring gear 7.

The ring-gear carrier 8 and the ring gear 7 are then axially fastened by the guard ring 9. The ring gear 7 is axially fixed via the ring-gear 8 and the axial bearing 58.

In the embodiment of FIG. 4, the sun wheel 1 is first axially pushed upon the drive shaft 2 after which the planet gears 4 are inserted in the thrust ring 17. The bolts 5 are then passed through the bores of the planet gears 4 and firmly connected with the previously positioned planet carrier 6.

The ring gear 7 is then inserted via the planet gears 4 and the ring-gear carrier 8 into the clutch teeth 52 of the ring gear 7.

The ring-gear carrier 8 and the ring gear 7 are finally fixed by the guard ring 9. The ring gear 7 is axially fixed via the ring-gear carrier 8 and the axial bearing 58 while the sun wheel 1 can axially face toward the planet gears 4 and accordingly adjust itself freely on the drive shaft 2.

In the assembly, according to the final embodiment of FIG. 5, the sun wheel 1 is first slipped axially upon the drive shaft 2 after which the planet gears 4 are inserted radially from outside between the thrust rings 17 and 18. The bolts 5 are then passed through the bores of the planet gears 4 and firmly connected with the previously positioned planet carrier 6.

Thereafter the ring gear 7 is pushed via the planet gears 4 and the ring-gear carrier 8 into the clutch teeth 52 of the ring gear 7.

The ring-gear carrier 8 and the ring gear 7 are finally axially fixed by the guard ring 9. The ring gear 7 is axially fixed via the ring-gear carrier 8 and the axial bearing 58 while the sun wheel 1 can axially face toward the planet gears 4 and accordingly position itself freely upon the drive shaft 2.

In the arrangement according to FIG. 5, depending on the load direction, a respective abutment on the corresponding thrust ring 17 or 18 is possible within a preset play.

The arrangement according to the invention makes possible a support of the axial forces of a helically cut planetary gear which is easy to assemble while entirely meeting the requirements. The arrangement is of reasonable cost in relation both to the small expenditure in parts and the improved assembly conditions.

REFERENCE NUMERALS 1 sun wheel
2 drive shaft
3 sun-wheel teeth surfaces
4 planet gears
5 bolt
6 planet carrier
7 ring gear
8 ring-gear carrier
9 guard ring
17 thrust ring
18 thrust ring
19 pair of pressure surfaces
20 pair of pressure surfaces
22 thrust ring
24 pair of pressure surfaces
50 inner teeth
52 clutch teeth
54 inner teeth
56 clutch teeth
58 roller bearing
60 clutch body
62 disc
64 plate spring
66 ring
68 support
70 teeth

We claim:

1. A helically cut planetary gear assembly, for a motor vehicle, said planetary gear assembly comprising:

sun gear teeth (3) non-rotatably connectable with a drive shaft (2), and said sun gear teeth (3) being helically cut teeth (3);

a plurality of planet gears (4) being mounted on a planet carrier (6), each of said plurality of planet gears (4) having helically cut teeth meshing with said helically cut sun gear teeth (3);

a ring gear (7) surrounding said planet gears (4), said ring gear (7) having helically cut teeth meshing with the helically cut teeth of said plant gears (4) and said ring gear (7) being connected with a ring-gear carrier (8); and a plurality of pairs of pressure surfaces (19, 24) for absorbing axial forces generated during transmission of drive through said planetary gear assembly;

wherein only two pairs of pressure surfaces (19, 24) are provided for absorbing axial forces generated by stress of said helically cut teeth during transmission of drive through said planetary gear assembly; a first of said two pairs of pressure surfaces (19, 24) is formed in an area adjacent said sun gear teeth (3) and located axially between said drive shaft (2) and said planet gears (4); and a second of said two pairs of pressure surfaces (19, 24) is formed on a side facing said ring gear carrier (8) and located axially between said planet gears (4) and ring gear carrier (8).

2. The planetary gear assembly according to claim 1, wherein said two pairs of pressure surfaces (19, 24) each extend to an area of said planet gears (4) in which said planet gears (4) is uncut.

3. The planetary gear assembly according to claim 1, wherein one pressure surface of the said second of said two pairs of pressure surfaces (24) is formed by a pressure surface integral with said ring-gear carrier (8).

4. The planetary gear assembly according to claim 1, wherein two mating pressure surfaces of at least one of said two pairs of pressure surfaces (19, 24) are crowned.

5. The planetary gear assembly according to claim 1, wherein two mating pressure surfaces of at least one of said two pairs of pressure surfaces (19, 24) are conical.

6. The planetary gear assembly according to claim 5, wherein said two mating conical pressure surfaces have a cone angle of between five angular minutes and six degrees.

7. The planetary gear assembly according to claim 1, wherein said ring-gear carrier (8) is axially supported, relative to said planet carrier (6), by a roller bearing (58) acting in an axial direction.

8. The planetary gear assembly according to claim 1, wherein said sun-wheel teeth (3) are formed by teeth formed integral with said drive shaft (2).

9. The planetary gear assembly according to claim 1, wherein said sun-wheel teeth (3) are situated upon a sun wheel (1) which is non-rotatably connected with said drive shaft (2).

10. The planetary gear assembly according to claim 1, wherein a thrust ring (17), which forms one pressure surface of said two pairs of pressure surfaces (19), is integral with said sun wheel (1).

11. The planetary gear assembly according to claim 7, wherein said roller bearing (58) has an axial play greater than an axial play of a bearing (68) of said planet carrier (6).

12. A helically cut planetary gear assembly, for a motor vehicle, said planetary gear assembly comprising:
 sun gear (1) having helically cut teeth (3), said sun gear (1) being non-rotatably connected with a drive shaft (2), and one of said drive shaft (2) and said sun gear (1) supporting first and second thrust rings (17);
 a plurality of planet gears (4) being mounted on a planet carrier (6), each of said plurality of planet gears (4) having helically cut teeth meshing with said helically cut teeth (3) of said sun gear;
 a ring gear (7) surrounding said planet gears (4), said ring gear (7) having helically cut teeth meshing with the helically cut teeth of said plant gears (4) and said ring gear (7) being connected with a ring-gear carrier (8); and
 a plurality of pairs of pressure surfaces (19, 24) for absorbing axial forces generated during transmission of drive through said planetary gear assembly;

wherein only three pairs of pressure surfaces (19, 24) are provided for absorbing axial forces generated during transmission of drive through said planetary gear assembly; a first of said three pairs of pressure surfaces (19, 24) is formed between a surface of said first thrust ring (17), facing a first side of said planet gears (4), and adjacent surfaces on the first side of said planet gears (4); a second of said three pairs of pressure surfaces (19, 24) is formed between a surface of said ring gear carrier (8), facing a second opposed side of said planet gears (4), and adjacent surfaces on the second opposed side of said planet gears (4); and a third of said three pairs of pressure surfaces (19, 24) is formed between a surface of a second thrust ring (17), facing the second opposed side of said planet gears (4), and adjacent surfaces on the second opposed side of said planet gears (4).

13. The planetary gear assembly according to claim 12, wherein said two pairs of pressure surfaces (19, 24) each extend to an area of said planet gears (4) in which said planet gears (4) is uncut.

14. The planetary gear assembly according to claim 12, wherein one pressure surface of the said second of said two pairs of pressure surfaces (24) is formed by a pressure surface integral with said ring-gear carrier (8).

15. The planetary gear assembly according to claim 12, wherein two mating pressure surfaces of at least one of said two pairs of pressure surfaces (19, 24) are crowned.

16. The planetary gear assembly according to claim 12, wherein two mating pressure surfaces of at least one of said two pairs of pressure surfaces (19, 24) are conical.

17. The planetary gear assembly according to claim 12, wherein said ring-gear carrier (8) is axially supported, relative to said planet carrier (6), by a roller bearing (58) acting in an axial direction.

18. The planetary gear assembly according to claim 12, wherein said sun-wheel teeth (3) are one of formed by teeth formed integral with said drive shaft (2) and situated upon a sun wheel (1) which is non-rotatably connected with said drive shaft (2).

19. The planetary gear assembly according to claim 12, wherein a thrust ring (17), which forms one pressure surface of said two pairs of pressure surfaces (19), is integral with said sun wheel (1).

20. A helically cut planetary gear assembly, for a motor vehicle, said planetary gear assembly comprising:
 sun gear (1) having helically cut teeth (3), said sun gear (1) being non-rotatably connected with a drive shaft (2), and one of said drive shaft (2) and said sun gear (1) supporting a thrust ring (17);
 a plurality of planet gears (4) being mounted on a planet carrier (6), each of said plurality of planet gears (4) having helically cut teeth meshing with said helically cut teeth (3) of said sun gear;
 a ring gear (7) surrounding said planet gears (4), said ring gear (7) having helically cut teeth meshing with the helically cut teeth of said plant gears (4) and said ring gear (7) being connected with a ring-gear carrier (8); and
 a plurality of pairs of pressure surfaces (19, 24) for absorbing axial forces generated during transmission of drive through said planetary gear assembly;
 wherein only two pairs of pressure surfaces (19, 24) are provided for absorbing axial forces generated during transmission of drive through said planetary gear assembly; a first of said two pairs of pressure surfaces (19, 24) is formed between a surface of said thrust ring (17), facing a first side of said planet gears (4), and adjacent surfaces on the first side of said planet gears (4); and a second of said two pairs of pressure surfaces (19, 24) is formed between a surface of said ring gear carrier (8), facing a second opposed side of said planet gears (4), and adjacent surfaces on the second opposed side of said planet gears (4).

* * * * *